Patented June 4, 1946

2,401,519

UNITED STATES PATENT OFFICE 2,401,519

VULCANIZATION ACCELERATORS

Albert A. Somerville, Carmel, N. Y., assignor to R. T. Vanderbilt Co. Inc., New York, N. Y., a corporation of New York No Drawing. Application October 14, 1944, Serial No. 558,746

3 Claims. (Cl. 260—793)

I have invented a new composition of matter which has several important advantages in the compounding of rubber and rubber-like materials for accelerated vulcanization. My new composition consists essentially of tetraethyl thiuram disulfide and a small proportion, less than about 1% by weight on the tetraethyl thiuram disulfide, of tetraethyl thiuram monosulfide.

Solid powders tend to dust and, in varying degrees, tend to resist incorporation into rubber mixes on conventional compounding mills. Tetraethyl thiuram disulfide, a particularly effective vulcanization accelerator, is a solid under mill room conditions and is usually handled as a more or less granular powder.

The conventional method of limiting dusting of similar powders is to incorporate in the powder, before it is added to the mix on the mill, a small percentage of an inert liquid such as a high boiling mineral oil.

I have discovered that the addition of a small proportion of tetraethyl thiuram monosulfide to, and thorough mixing with powdered tetraethyl thiuram disulfide produces a dustless, slightly sticky and cohesive but nevertheless relatively free flowing, powder which disperses in rubber mixes rapidly and easily. The proportion of tetraethyl thiuram monosulfide I use is smaller than the percentage of inert liquid conventionally used with other powders. If the percentage of tetraethyl thiuram monosulfide is as much as about 1% on the tetraethyl thiuram disulfide, the product tends to become smeary. Percentages of tetraethyl thiuram monosulfide as small as can be identified are useful. I may use proportions varying from about 0.1% to about 0.9% by weight on the tetraethyl thiuram disulfide. I find a mixture of about 1 part by weight of tetraethyl thiuram monosulfide and 199 parts by weight of tetraethyl thiuram disulfide to be particularly advantageous. Thus, in one aspect, the proportion of added material is reduced. But, in another aspect, the presence of inert material is eliminated since the tetraethyl thiuram monosulfide is also an active accelerator of vulcanization. Also, the addition of this small proportion of tetraethyl thiuram monosulfide appears to improve the properties of the mixture with respect to dispersion in compounds of rubber and rubber-like materials.

Tetraethyl thiuram disulfide has a melting point of 65°–70° C. Tetraethyl thiuram monosulfide is a liquid at ordinary atmospheric temperatures.

The results attained with my new composition are not to be explained solely by the wetting of the solid tetraethyl thiurum disulfide particles with the liquid tetraethyl thiuram monosulfide. The trifling proportions of the monosulfide necessary evidences this. Apparently some function of solubility, or of mutual miscibility, of the two closely related compounds makes these results possible.

In its preferred form, my new composition consists of tetraethyl thiuram disulfide and a small proportion, say about 0.5% by weight on the tetraethyl thiuram disulfide of tetraethyl thiuram monosulfide and is free from inert materials. The composition is an easily handled granular powder, dust-free, which disperses rapidly and easily in rubber mixes on conventional compounding mills. It is all accelerator.

I claim:

1. A composition of matter consisting essentially of tetraethyl thiuram disulfide and about 0.1%–0.9% by weight on the tetraethyl thiuram disulfide of tetraethyl thiuram monosulfide.

2. A composition of matter consisting essentially of tetraethyl thiuram disulfide and about 0.5% by weight on the tetraethyl thiuram disulfide of tetraethyl thiuram monosulfide.

3. A composition of matter consisting of tetraethyl thiuram disulfide and about 0.1%–0.9% by weight on the tetraethyl thiuram disulfide of tetraethyl thiuram monosulfide and free from inert material.

ALBERT A. SOMERVILLE.